United States Patent
Matsubara

(10) Patent No.: US 6,532,478 B1
(45) Date of Patent: Mar. 11, 2003

(54) FILE LOADER IN INFORMATION PROCESSING SYSTEM OF MULTIPROCESSOR CONFIGURATION

(75) Inventor: Takashi Matsubara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/547,318

(22) Filed: Apr. 11, 2000

(30) Foreign Application Priority Data

Jul. 14, 1999  (JP) .......................................... 11-200037

(51) Int. Cl.[7] .............................................. G06F 17/30
(52) U.S. Cl. ........................ 707/200; 712/28; 714/41; 709/203; 707/1; 707/10
(58) Field of Search .......................... 707/10, 200, 201, 707/202, 6, 4, 205, 8; 709/104, 105, 238, 239, 231, 203, 223; 714/2, 4, 798; 717/116; 700/287, 41, 231, 203; 713/1; 712/28

(56) References Cited

U.S. PATENT DOCUMENTS

| | | | |
|---|---|---|---|
| 4,530,051 A | * 7/1985 | Johnson et al. | 709/203 |
| 5,003,466 A | * 3/1991 | Schan et al. | 714/41 |
| 5,537,622 A | * 7/1996 | Baum et al. | 707/1 |
| 5,539,883 A | * 7/1996 | Allon et al. | 709/105 |
| 5,550,846 A | 8/1996 | Staiger | 714/738 |
| 5,630,129 A | * 5/1997 | Wheat | 709/105 |
| 5,648,917 A | 7/1997 | Ebersohl et al. | 702/186 |
| 5,671,430 A | * 9/1997 | Gunzinger | 712/28 |

FOREIGN PATENT DOCUMENTS

| | | | |
|---|---|---|---|
| EP | 123337 A2 | * 10/1984 | G06F/9/38 |
| JP | 2-259842 | 10/1990 | |
| JP | 4-81937 | 3/1992 | |
| JP | 5-159081 | 6/1993 | |
| JP | 6-222941 | 8/1994 | |
| JP | 6-2311091 | 8/1994 | |
| JP | 7-325727 | 12/1995 | |
| JP | 9-258995 | 10/1997 | |
| JP | 10-11412 | 1/1998 | |

* cited by examiner

Primary Examiner—Kim Vu
Assistant Examiner—Gewn Liang
(74) Attorney, Agent, or Firm—Katten Muchin Zavis Rosenman

(57) ABSTRACT

A file loader including a processor configuration management unit for managing status information of processors, a function database management unit for managing storage information of running files corresponding to functions installed in the processors, and a file load control unit for (i) recognizing other processors in the system having functions identical to a function which has to be installed in the concerned processor based on the storage information, (ii) searching for one processor among the other processors to send the files, while referring to the status of the other processors by the status information, and (iii) performing control for making the above sender processor load the running files required for the related function.

9 Claims, 11 Drawing Sheets st=0: PROCESSOR NOT YET MOUNTED
   1: PROCESSOR UNDER CONSTRUCTION
   2: PROCESSOR WORKING (NORMAL)
   3: PROCESSOR HAS COMMUNICATION LINE FAULT
   4: PROCESSOR BLOCKED

Fig. 4

| STATUS OF PROCESSOR (st) | EXPLANATION OF STATUS OF PROCESSOR |
|---|---|
| PROCESSOR NOT YET MOUNTED | STATUS WHERE PROCESSOR IS NOT YET MOUNTED. IT IS NOT POSSIBLE TO COMMUNICATE WITH NOT YET MOUNTED PROCESSOR. |
| PROCESSOR UNDER CONSTRUCTION | STATUS OF PROCESSOR IN TRANSITION FROM NOT YET MOUNTED STATUS TO WORKING STATUS. IN THIS STATUS, LIMITED INTER-PROCESSOR COMMUNICATION ENABLING ONLY LOADING FILE TO PROCESSOR IS POSSIBLE. FURTHER, THIS STATUS IS ALSO USED FOR PROCESSORS WHICH START BEING DELETED. |
| PROCESSOR WORKING (NORMAL) | STATUS WHERE COMMUNICATION WITH PROCESSOR IS POSSIBLE AND WHERE ALL INTER-PROCESS REQUESTS FOR COMMUNICATION CAN BE EXECUTED. |
| PROCESSOR HAS COMMUNICATION LINE FAULT | STATUS WHERE COMMUNICATION LINE OF ONE PROCESSOR WITH ANOTHER BECOMES DISABLED. DURING THIS TIME, PROCESSORS ARE IN OPERATION, SO INTER-PROCESS COMMUNICATION CAN BE CARRIED OUT WITHOUT RESTRICTION WITH OTHER PROCESSORS IN COMMUNICABLE STATES. FURTHER, COMMUNICATION BETWEEN PROCESSORS HAVING A FAULTY COMMUNICATION LINE AND ANOTHER PROCESSOR MAY ALSO BE POSSIBLE. |
| PROCESSOR BLOCKED | STATUS WHERE INTER-PROCESSOR COMMUNICATION LINK IS FAULTY OR BLOCKED FOR MAINTENANCE. IN THIS STATUS, COMMUNICATION BETWEEN PROCESSORS IS IMPOSSIBLE. | n: INDIVIDUAL PROCESSOR NUMBER

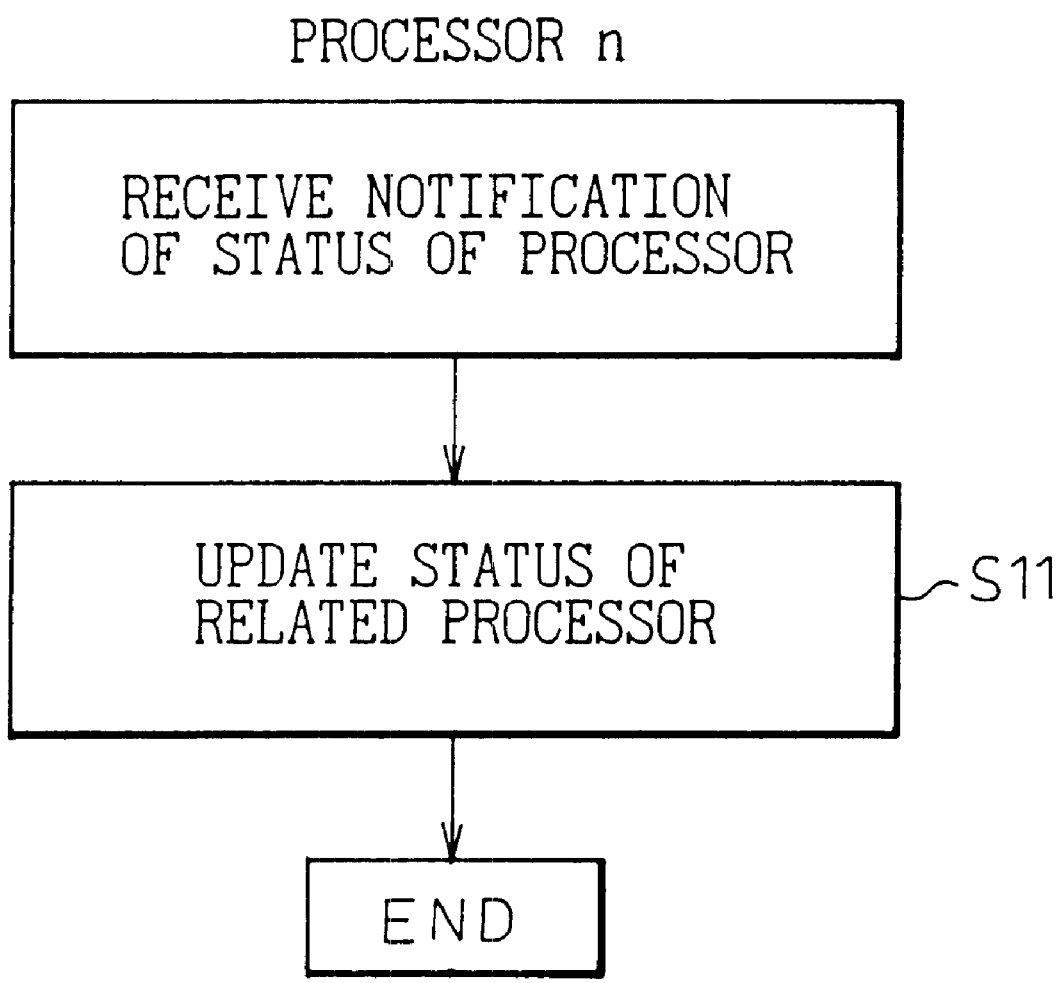

i: 1/0=INSTALLED/NOT INSTALLED
j: 1/0=IN FILE TRANSFER/IDLE
k: 1/0=ACTIVE/NONACTIVE
l: NUMBER OF FILES COMPOSING FUNCTION

*1: KIND OF MEDIA TO READ FILE THEREFROM
    MO/HDK/MM/etc.
*2: ATTRIBUTE OF FILE
    SYSTEM FILE/DATA/DOWNLOADED FILE/etc.

m:1 CONSECUTIVE EXTRACTION OF PROCESSOR NUMBERS IN DESCENDING ORDER FROM PROCESSOR CONCERNED
m:2 CONSECUTIVE EXTRACTION OF PROCESSOR NUMBERS IN ASCENDING ORDER FROM PROCESSOR CONCERNED
m:3 ALTERNATE CONSECUTIVE EXTRACTION OF PROCESSOR NUMBERS IN DESCENDING ORDER AND ASCENDING ORDER FROM PROCESSOR CONCERNED

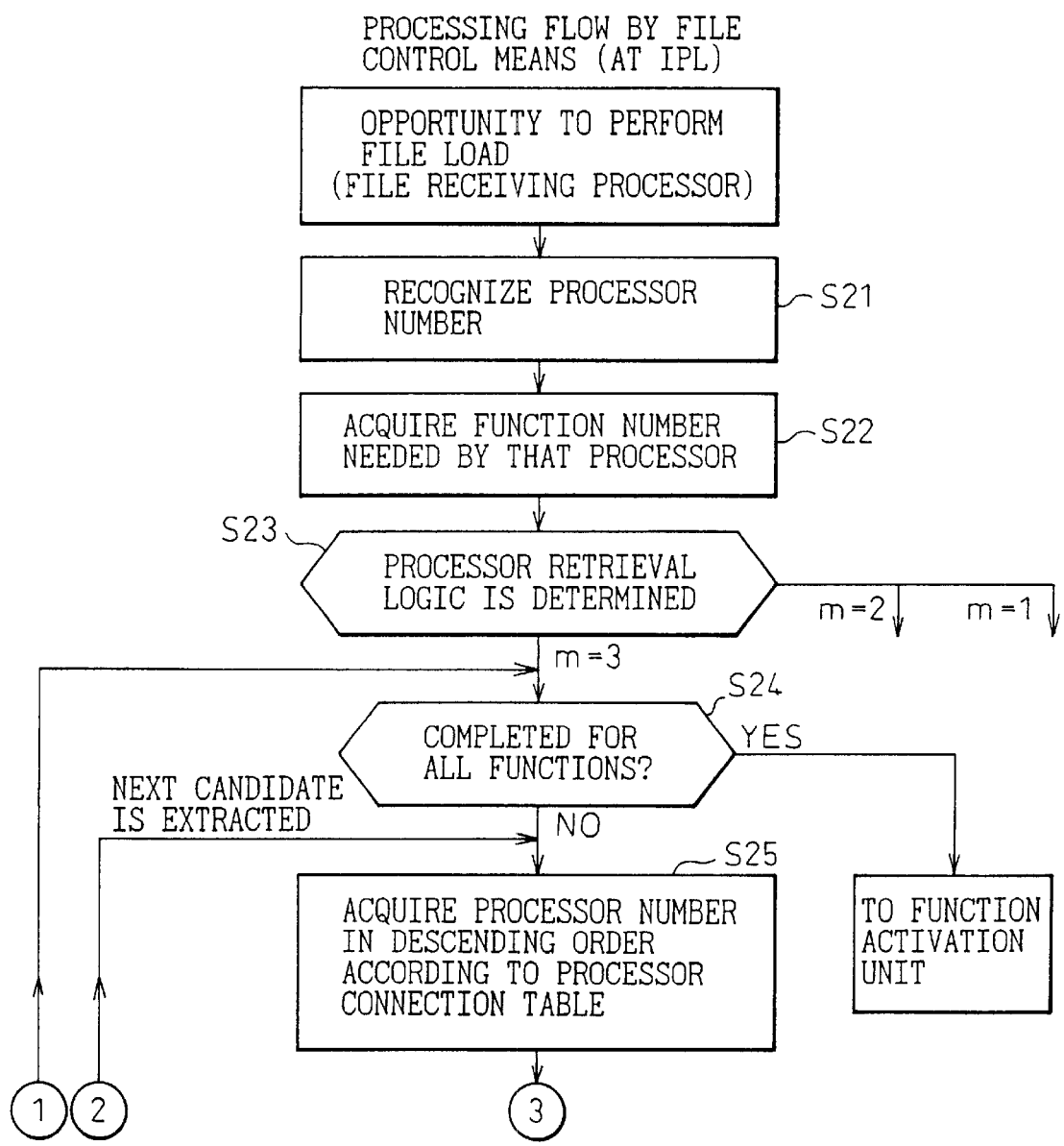

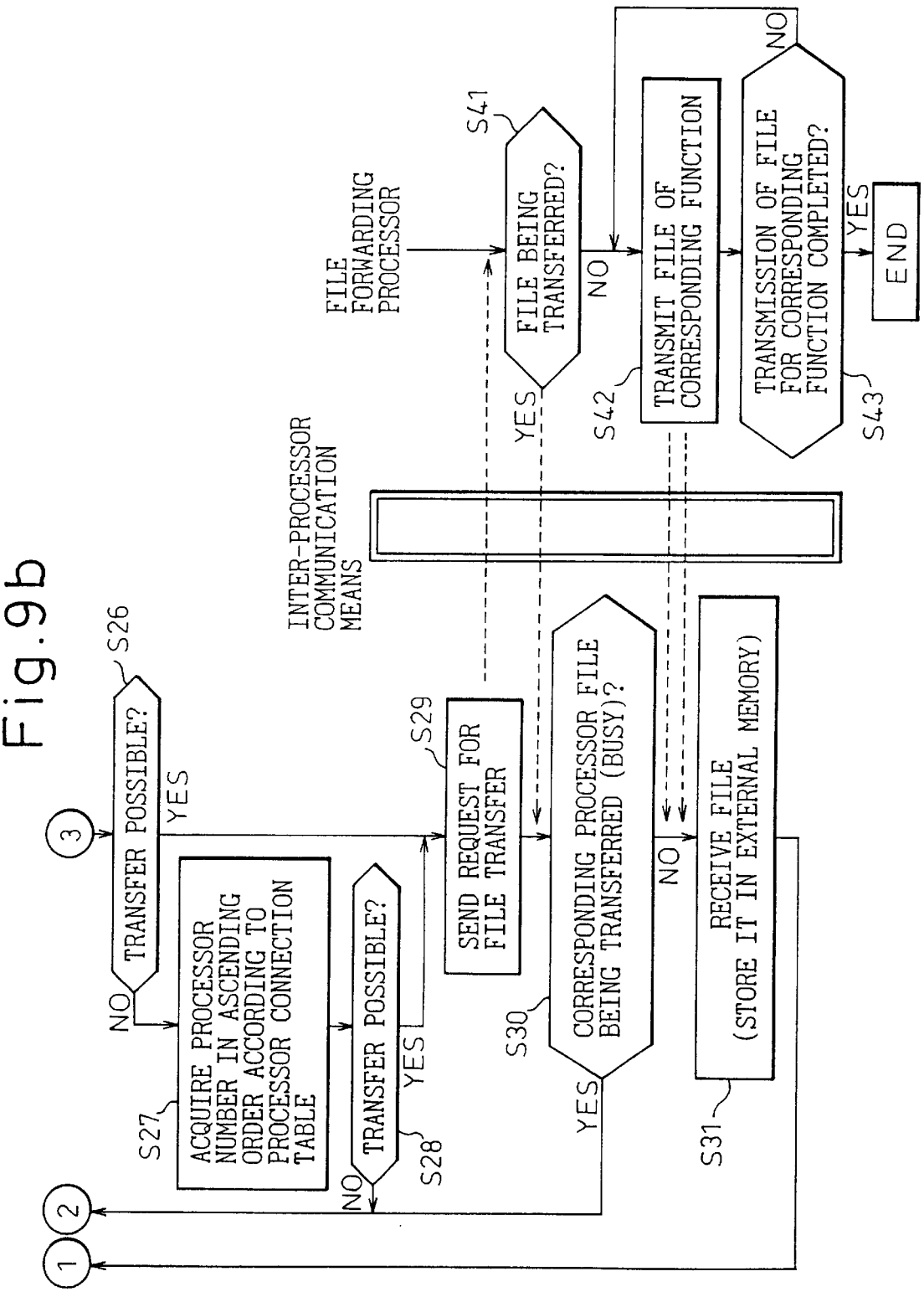

FILE LOADER IN INFORMATION PROCESSING SYSTEM OF MULTIPROCESSOR CONFIGURATION

BACKGROUND OF THE INVENTION

1. Field of the Invention

The present invention relates to a file loader for automatically loading running files (programs, data, and download files, and other files) required for a function to be installed in the processors of an information processing system of a multiprocessor configuration from any processor in the system.

2. Description of the Related Art

In a large scale information processing system such as an exchange system, the multiprocessor configuration is frequently adopted for distributing the load among a plurality of processors. In this case, the system is generally configured with just one managing processor provided in the system and with the remaining processors made managed processors. Usually, programs, data, download files, and other running files to be loaded to the managed processors are exclusively transferred from the managing processor.

This system where a managing processor centrally manages the running files at one location in this way suffers from the following problems:

First, if an initial program load (IPL) or other opportunity for loading running files occurs simultaneously at a plurality of processors, the load concentrates at the managing processor transferring the files. The managing processor often backs up these files by storing them in an external memory. This external memory, however, is slow in read speed. In addition to this, when the single managing processor receives a large number of file read requests, congestion of processing occurs and a further slowing of the read speed may be caused.

Further, when the managing processor sending the files is unable to transfer files due to for example its going down, this means that it can no longer transmit files, when an IPL or other opportunity for loading running files occurs in other managed processors, to these managed processors, so the continuity of service of the system as a whole is remarkably degraded.

SUMMARY OF THE INVENTION

The present invention was made in consideration with the above problems and has as an object thereof to provide a file loader in an information processing system of a multiprocessor configuration which does not specify any one processor as the file sender for a processor to be loaded with running files, but enables automatic selection of it flexibly or on-line (state of continuity of service) and thereby prevents the load concentrating at any specific processor at the time of file transfer and the consequent deterioration of performance and prevents a suspension of service when the processor sending the file goes down.

To attain the above object, the file loader of the present invention provides a processor configuration managing means for managing status information of processors in the system, a function database managing means for managing storage information of running files corresponding to functions to be installed in the processors, an inter-processor communication controlling means, a file load controlling means for recognizing other processors in the system having functions identical to a function which needs to be installed in the concerned processor based on the storage information of the function database managing means, referring to the status of the other processors by the status information of the processor configuration managing means and searching for another processor to send files according to a predetermined retrieval logic, and performing control via the inter-processor communication controlling means for making the other processor load the running files required for the related function, a memory for storing the running files, and a function activating means for activating the function by the running files. This makes it possible to avoid the concentration of the load at a specific processor at the time of file transfer and the consequent degradation of the performance and to avoid a suspension of service when a processor sending a file goes down.

BRIEF DESCRIPTION OF THE DRAWINGS

The above object and features of the present invention will be more apparent from the following description of the preferred embodiments given with reference to the accompanying drawings, wherein:

FIG. 4 is a view for explaining various processor statuses represented by the processor status management table in the loader of the embodiment.

FIGS. 6a and 6b are flowcharts of processing routines at the processor configuration management unit in the loader of the embodiment;

FIGS. 9a and 9b are flowcharts of processing routines in the file load control unit in the loader of the embodiment.

DESCRIPTION OF THE PREFERRED EMBODIMENTS

Figure 1:
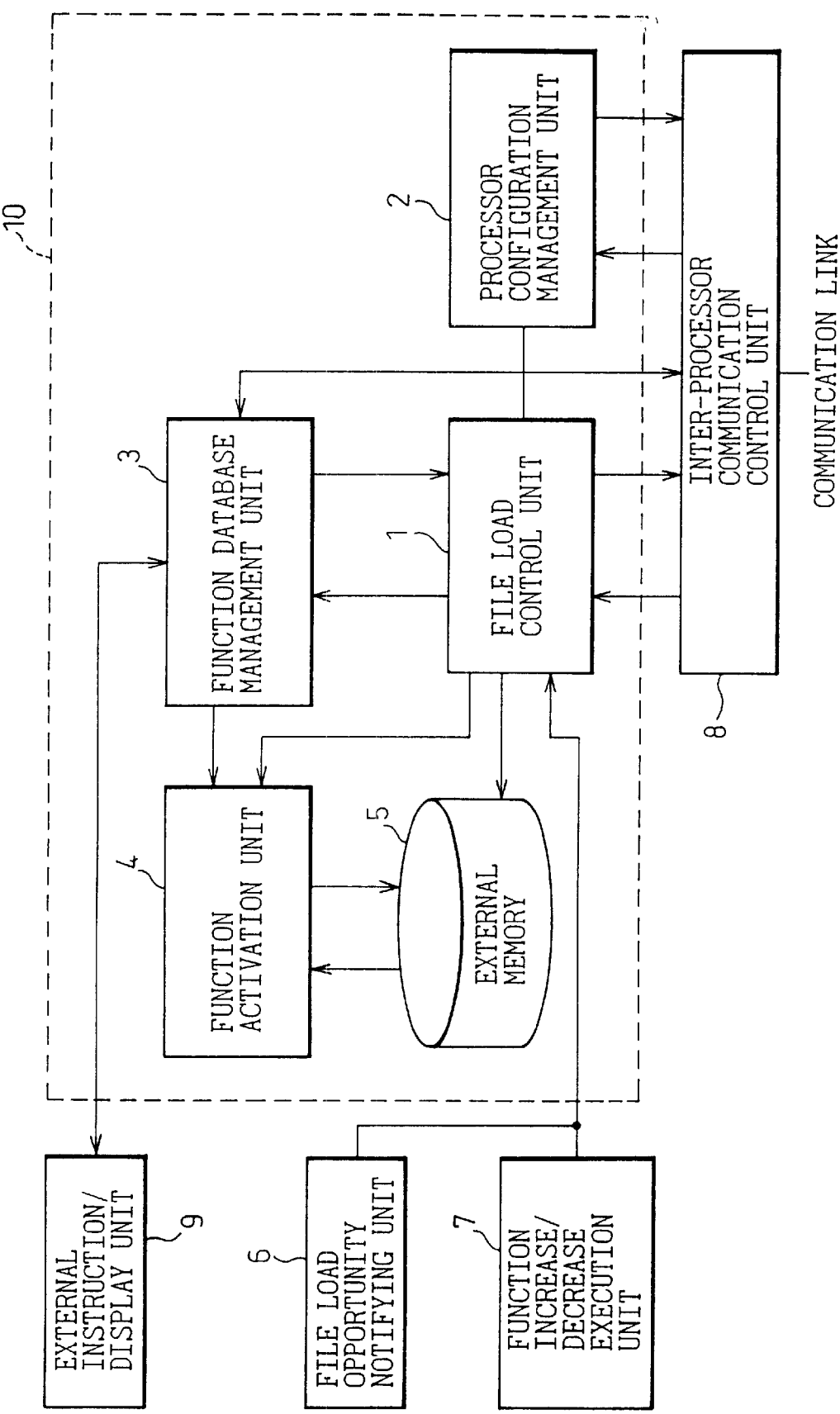
FIG. 1 is a block diagram of the configuration of a file loader according to an embodiment of the present invention.

Preferred embodiments of the present invention will be described in detail below while referring to the attached figures.

The file loader according to the present invention is provided in each processor in an information processing system of a multiprocessor configuration.

This file loader is provided with a processor configuration managing means, function database managing means, inter-processor communication controlling means, file load controlling means, memory, and function activating means.

The processor configuration managing means manages the status information of the processors in the system.

The function database managing means manages the storage information of running files corresponding to functions to be installed in the processors.

The inter-processor communication controlling means communicates with other processor in the system.

The file load controlling means recognizes other processors in the system having functions identical to a function which needs to be installed in the concerned processor based on the storage information of the function database managing means, refers to the status of the other processors by the status information of the processor configuration managing means and searches for another processor to send the files according to a predetermined retrieval logic, and performs control via the inter-processor communication controlling means for making the other processor load the running files required for the related function.

The memory stores the running files loaded from the other processor.

The function activating means initializes the processor in accordance with the running files to activate the related function after the running files finish being loaded from the other processor into the memory.

In such a configuration, when it becomes necessary to install a certain function into a concerned processor due to for example an initial program load or an increase of the functions, the file load controlling means recognizes the other processors in the system having functions identical to the function which has to be installed based on the storage information of the function database managing means, refers to the status of the other processors by the status information of the processor configuration managing means and searches for another processor to send the files according to a predetermined retrieval logic, and performs control via the inter-processor communication controlling means for making the other processor load the running files required for the related function.

These running files are loaded in the memory and then activated by the function activating means to enable the provision of service.

The file load controlling means can be configured provided with a plurality of retrieval logics for selection of the file sending processor in advance and to be able to select from any of these retrieval logics. One of the retrieval logics may be for consecutive retrieval of the processors holding the running files required for the concerned processor from the processor number near the concerned processor to more distant processor numbers. Further, the selection of the retrieval logic can be altered from the outside by an instruction or command of maintenance personnel.

Further, the function database managing means automatically detects new installation and deletion of functions and simultaneously updates the running file storage information along with the installation/deletion for all processors in the system, whereby all processors can be made to hold identical function databases.

Next, an explanation will be made of a preferred embodiment of the present invention by referring to the drawings.

Figure 2:
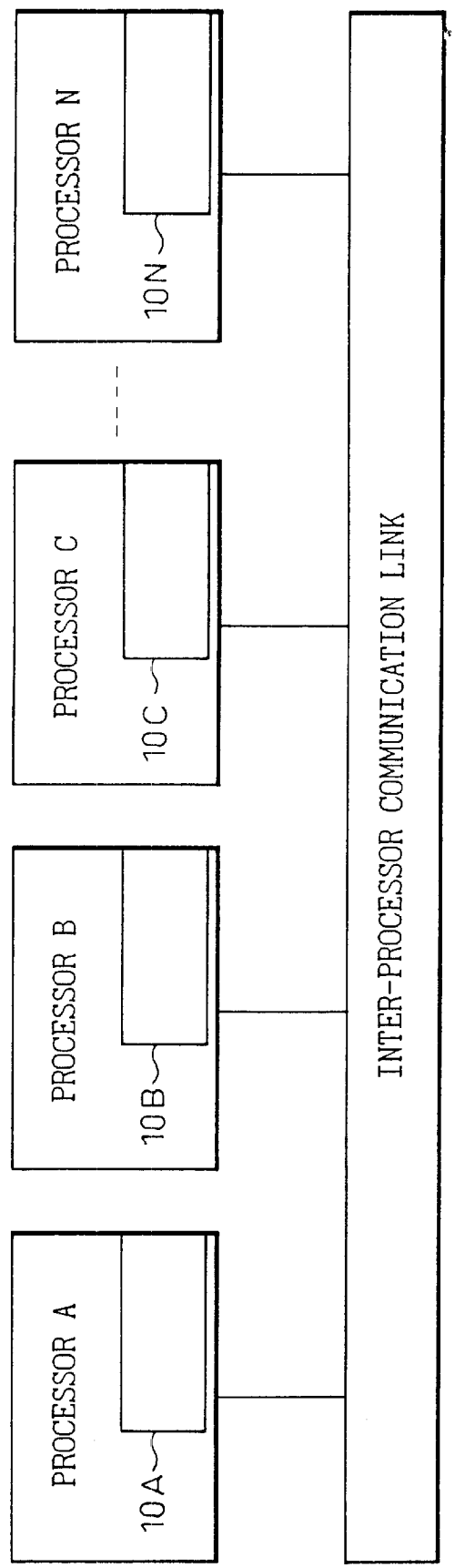
FIG. 2 is a view of an information processing system of a multiprocessor configuration in which each processor is provided with a file loader of the embodiment.

FIG. 1 is a view of a file loader according to an embodiment of the present invention, and FIG. 2 is a view of an information processing system of a multiprocessor configuration where each processor is provided with the file loader of the present embodiment.

In FIG. 2, this multiprocessor configuration is formed by inter-connection of a plurality of processors A, B, C, ... N by an inter-processor communication link. The file loaders 10A, 10B, 10C, ... 10N of the present invention are configured so as to be equally mounted in these processors A, B, C, ... N in the system. There is no master station and slave station relation as between the managing processor and the managed processor of the related art among these processors A, B, C, ... N. They are all equal to each other as processors.

Note that, as the inter-processor communication link, there are the star type, ring type, mesh type, bus type, and other configurations. The present invention can be applied to all of these connection types, but the effect of use is particularly high with the mesh type and the ring type. Therefore, in the following explanation, the mesh type will be used as a representative configuration of the inter-processor communication link.

Below, an explanation will be made of the loader of the embodiment of the present invention by referring to FIG. 1. The components inside the broken-line box indicated as the file load unit 10 are the main components of the present invention. The components outside the box are components generally provided in a large scale information processing system of a multiprocessor configuration. Here, the inter-processor communication control unit 8 has the following general functions usually installed in an information processing system of a multiprocessor configuration:

<1> a function of transparent data communication in a higher layer protocol among processors connected in a mesh configuration and <2> a function of initialization, blocking (closing), and restoration of a communication link and other management of the communication link.

Further, a file load opportunity notifying unit 6, a function increase/decrease execution unit 7, and an external instruction/display unit 9 are very general, so detailed explanations will be omitted.

The file load unit 10 comprises a file load control unit 1, a processor configuration management unit 2, a function database management unit 3, a function activation unit 4, and an external memory 5. Among them, the file load control unit 1, processor configuration management unit 2, function database management unit 3, and function activation unit 4 can be realized by processing by a software program. In this case, the program for realizing these functions is stored in the memory (computer readable storage device) in the processor.

[Processor configuration management unit 2]

The processor configuration management unit 2 functions to maintain a constant grasp of the status of all of the processors in the system and provide the statuses to processes requiring reference to these statuses. This function may be further broken down into the three functions of (i) maintaining a grasp over the status of the processors, (ii) referring to the status of the processors, and (iii) referring to the individual processor numbers.

This processor configuration management unit 2 assigns to each processor one of the statuses of "in use", "under construction", "working (normal)", "communication line fault", and "blocked" as the status of the processor and manages the status for each processor by a processor status management table.

Figure 3:
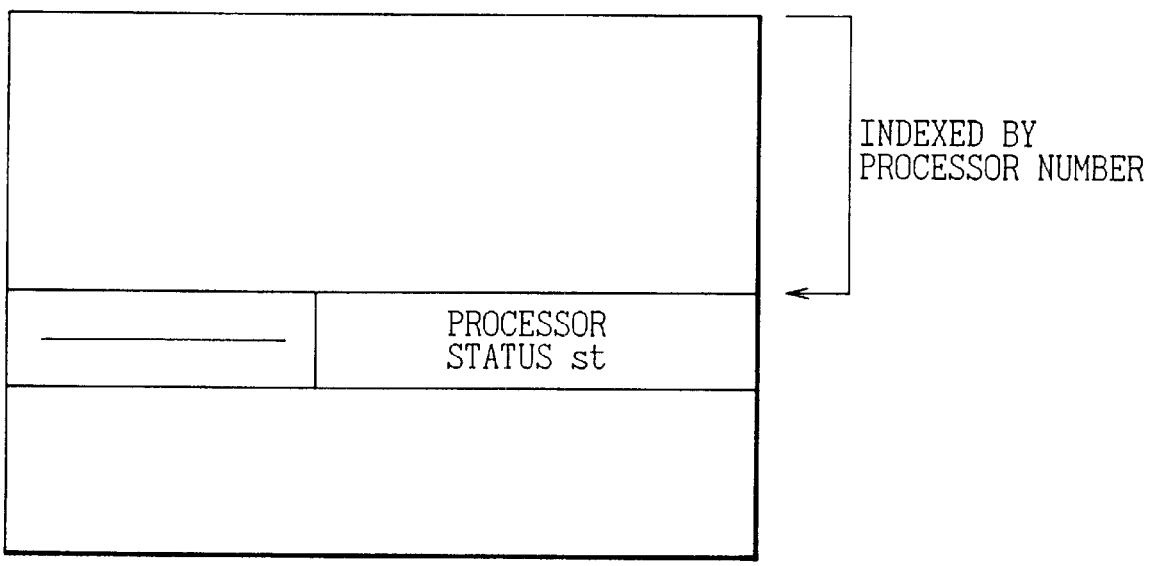
FIG. 3 is a view of an example of the configuration of a processor status management table in a processor configuration management unit in the loader of the embodiment.

FIG. 3 shows an example of the configuration of this processor status management table. As shown in FIG. 3, the processor status management table is configured so that the status st of a processor can be retrieved by its processor number. The following may be indicated by the values of the processor status st:

st=0: processor is not yet mounted st=1: processor is under construction st=2: processor is working (normal)

st=3: processor has communication line fault st=4: processor is blocked

As shown in FIG. 4, the definitions of the statuses are as follows:

"Not yet mounted" is the status where the processor is not yet mounted. It is not possible to communicate with such a not yet mounted processor.

"Under construction" is the status of a processor in transition from the not yet mounted status to the working status. In this "under construction" status, limited inter-processor communication enabling only loading a file to the processor is possible. Further, this "under construction" status is also used for processors which start being deleted.

"Working (normal)" is the status where communication with the processor is possible and where all inter-process requests for communication can be executed.

"Communication line fault" is the status where a communication line of one processor with another becomes disabled. During this time, the processors are in operation, so inter-process communication can be carried out without restriction with other processors in communicable states. Further, communication between a processor having a faulty communication line and another processor may also be possible.

"Blocked" is the status where the inter-processor communication link is faulty or blocked for maintenance. In this status, communication between processors is impossible.

Figure 5:
FIG. 5 is a view of an example of the data holding an individual processor number in the processor configuration management unit in the loader of the embodiment.

Further, this processor configuration management unit 2 holds data representing the number of the individual processor (individual processor number n) inside it as shown in FIG. 5 and provides a reference service providing this individual processor number n to processes requiring the individual processor number.

This processor configuration management unit 2 can be broken down into following control blocks.

(i) Control block for processor status management

Figure 6A:
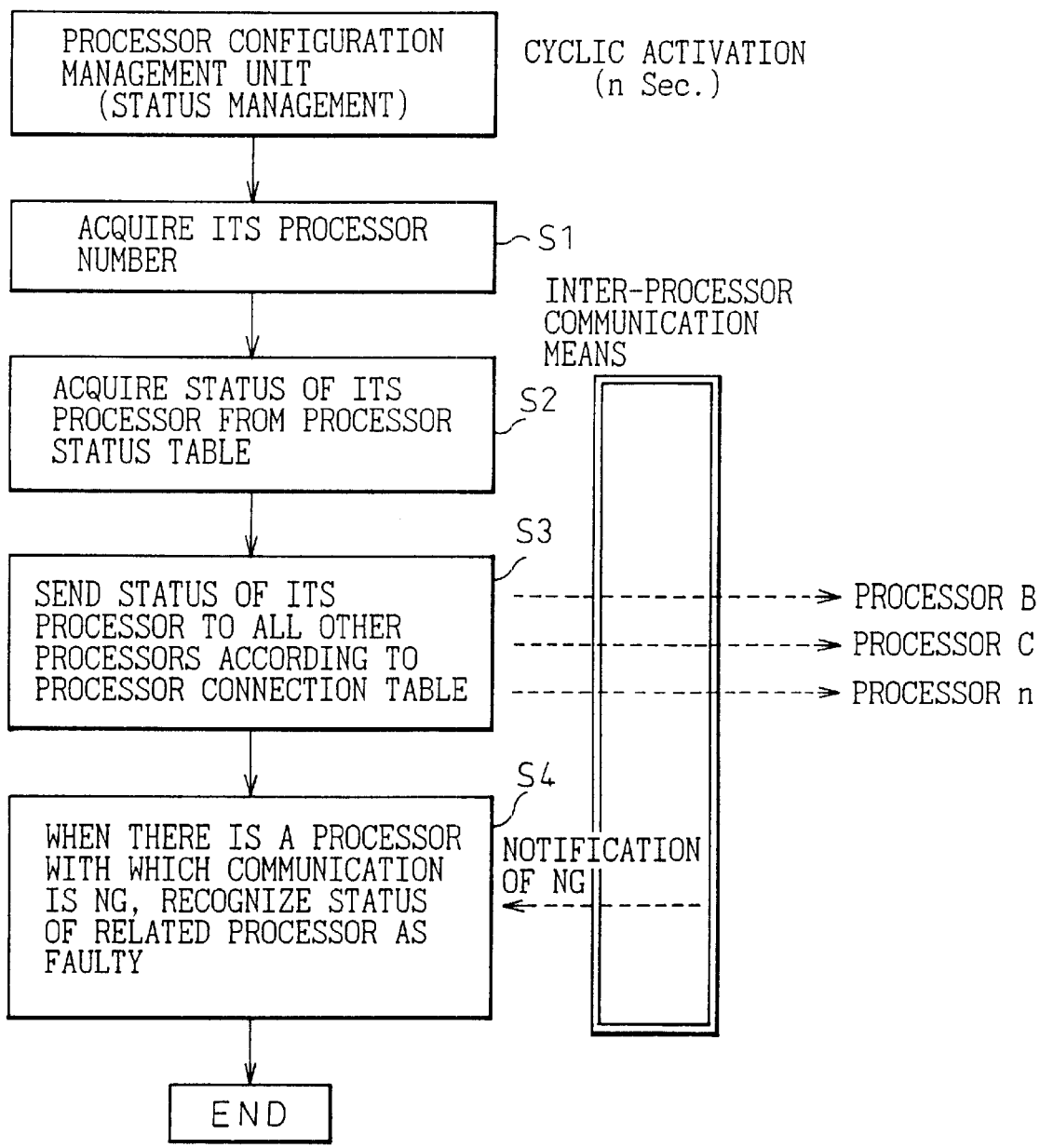

Whether communication with a certain processor is possible and even if communication is possible, whether the requested inter-process communication can be processed differ depending on the situation of the processor (processor status). Accordingly, the processor configuration management unit 2 determines the processor status in the system by the processing of FIGS. 6a and 6b shown next. In this processing, the processor configuration management unit 2 notifies the status of its processor to the other processors by a broadcast mode at regular intervals. Namely, the processor configuration management unit 2 is cyclically activated, acquires the concerned processor number by the individual processor number hold data (FIG. 5) (step S1), acquires the status of its processor from the processor status management table (FIG. 3) using this (step S2), and, if communication is possible, sends the status of its processor to all other processors in the system (step S3).

The processor configuration management unit 2 of each processor receiving the notification updates the processor status management table provided in the processor configuration management unit 2 (step S11) so as to enable a constant grasp of the status of all processors in the system. Further, when communication by not only the above regular notification, but also by the way of the inter-processor communicating means is not possible even after a predetermined number of retries, the processor is recognized as faulty.

(ii) Control block of processor configuration information referral service

When a processor number is given from the file load control unit 1 (FIG. 1) or the like as an input parameter and the processor configuration information referral service is started, the status information of that processor (mounting status, fault status, and so on) is read from the processor status management table and notified to the originating processor.

(iii) Control block of individual processor number referral service

When this individual processor number referral service is started from the file load control unit 1 or the like, the concerned processor number is read from the individual processor number holding data (FIG. 5) and the number of the concerned processor is notified to the originating processor.

[Function database management unit 3]

The function database management unit 3 determines and manages file information relating to the functions installed by all processors in the system. The file information relating to the functions is information concerning the programs, data, download files, and other running files optimal for the running modes (function) of all of the processors in an information processing system of a multiprocessor configuration. Then, the function management table provided in the function database management unit 3 is updated for these variety of functions. The table manages the locations of loading in the memory of the running files corresponding to the functions in all of the processors. Accordingly, it is possible to assign different functions to the processors. This function database management unit 3 provides the service of responding to inquiries from the file load control unit 1 about in which processors in the system a certain function is installed.

Specifically, the function database management unit 3 manages information concerning the running files of all functions installed in all of the processors in the system. The main function is to provide a referral service of function information such as the state of installation or noninstallation of running files relating to a function of a processor, file storage information such as the file storage address, etc. for a processor of a processor number given as an input parameter from the file load control unit 1.

Figure 7:
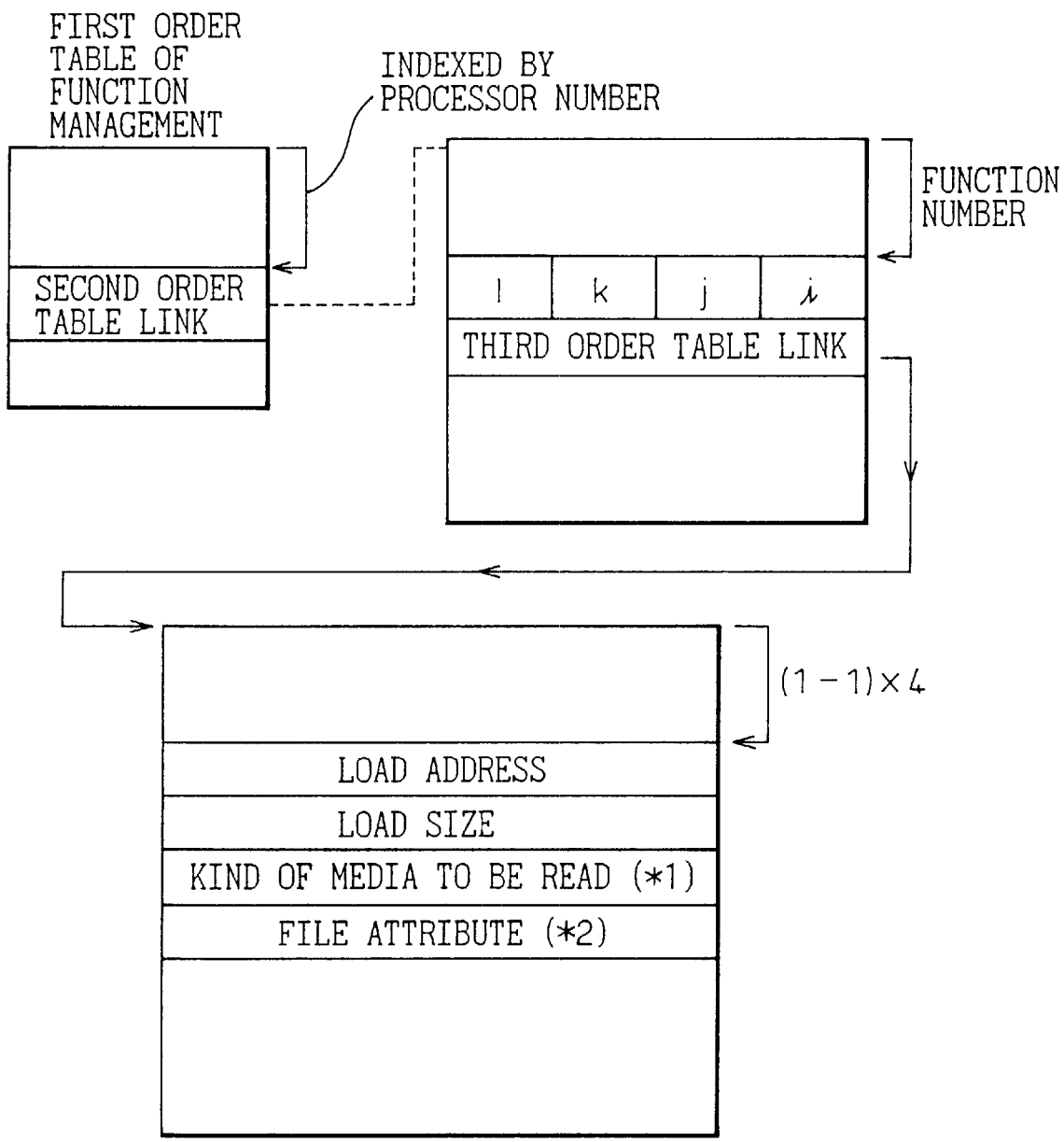
FIG. 7 is a view of an example of the configuration of a function management table in the function database management unit in the loader of the embodiment.

FIG. 7 shows the example of the configuration of this function management table. This function management table has a three-layer structure of a first order table, second order table, and a third order table. The first order table is a table searched through by the processor number and provides links of the second order table. Accordingly, in the function management table, the following function information and file storage information are stored in separate memory areas for every processor in the system.

The second order table is searched through by the function number. This function number is appropriately notified from the file load control unit 1 (FIG. 1) etc. according to need. This second order table stores information concerning the function corresponding to the function number. The information concerning the function includes the data i, j, k, and l. The meanings of the data i, j, k, and l are as follows.

"i" indicates that the function is "installed" when "1" and "not installed" when "0".

"j" indicates that the running files of that function are "in file transfer" when "1" and indicates "idle" when "0".

"k" indicates that the function is in an "active" state when "1" and in a "nonactive" state when "0".

"l" indicates the number of running files required for that function.

By searching through the second order table by the function number, it is possible to obtain a link of the third order table. The third order table stores storage information of the running files for realizing that function. In order to realize a certain function, generally a plurality of files is combined, so the third order table is comprised so that a plurality of file storage information can be obtained from one function number.

In actuality, the number of files corresponding to a function is acquired from the third order table management information (i to l in FIG. 5). By searching through the third order table by the number of each running file, it is possible to find information such as the storage information of that running file, that is, the address in the memory at which that running file is stored (load address), the size of that running file (load size), the kind of medium of the memory (the kind of the medium to read the file, for example, a magneto-optic memory MO, a hard disk HDK, MM, etc.), and the file attribute (for example, the distinction of a system file, data, download file, etc.)

For example, when explaining the flow up to when a processor B acquires a required file of a processor C based on the function management table, the function database management unit 3 (FIG. 1) first obtains the link information of the second order table from the header of the function management table according to the processor number of the processor C. When the second order table is acquired, the link of the third order table is acquired by searching by the function number. The third order table is comprised so that a plurality of file information is obtained from one function number. In actuality, the number of the files corresponding to a related function, load address information, size, type of the medium to read, etc. are acquired from the third order table management information (data i to l in FIG. 7). This information is provided as a response to the requesting source (file load control unit 1).

[File load control unit 1]

The file load control unit 1 has the function of using the processor configuration management unit 2 and the function database management unit 3 to collect the running files to be loaded to its processor from the other processors in the system and to load them in its processor.

The file load control unit 1 learns of the occurrence of a file load opportunity at its processor when notified by the file load opportunity notifying unit 6 of the occurrence of an IPL (including also system restart), increase of a processor, increase of new hardware, or other instructions (usually with addition of function number indicating function for realizing that instruction). It inquires about information concerning the running files required for realizing the instructed function from the function database management unit 3 and finds a processor having that function from inside the system if that function is not actually installed in the concerned processor.

Figure 8:
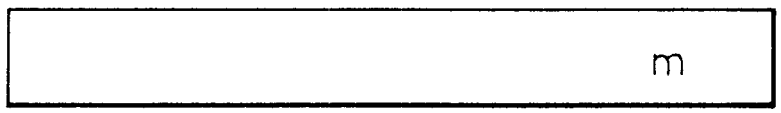
FIG. 8 is a view of an example of data for selecting the logic for extraction of the file sending processor in the file load control unit in the loader of the embodiment.

Several retrieval logics for retrieving this target processor are provided for example as follows. Data for selecting the different logics is prepared as shown in FIG. 8. By rewriting the data, which retrieval logic to use to obtain the file sending processor can be specified from the outside.

<1>Consecutive extraction of processor numbers in descending order from concerned processor number <2>Consecutive extraction of processor numbers in ascending order from concerned processor number <3>Alternate consecutive extraction of processor numbers in descending order and ascending order from concerned processor number.

By this, the load does not concentrate at the file sending processor (or inter-processor communication link) when a file load opportunity occurs in the system.

[Function activation unit 4]

When all of the running files required for realizing the target function finish being loaded to the external memory 5 (FIG. 1) of the concerned processor through the file load control unit 1 (FIG. 1), they are then started. The running files required for the main memory are opened from the external memory 5. The unit finds the attribute (classification of program, data, download file, etc.) of the running files for the open running files from the function database management unit 3 (FIG. 1), refers to the file attributes of the related running files, and initializes the processor in accordance with the attributes of the running file so as to activate the target function and enable the start of a variety of services.

Next, an explanation will be made of the operation of the loader of this embodiment. Here, the explanation will be given of the flow of the processing when assuming that an IPL (initial program load) occurs as the file load opportunity in the processor C of FIG. 2.

When an IPC occurs in the processor C due to for example a maintenance personnel depressing an IPL key, it becomes necessary to load the running files for realizing the function of this IPL in the processor C. The information of the occurrence of the IPL is notified to the file load control unit 1 by the file load opportunity notifying unit 6 (FIG. 1). At this time, as the type of the file load, an IPL (initial program load) instruction, that is, an instruction to load all running files for all functions of the processor C, is made. Note that the function numbers indicating all functions for the initial program loaded (IPL) are added to this instruction.

The processing sequence in the file load control unit 1 is shown in FIGS. 9a and 9b.

Details of the processing will be explained later with reference to the figures, but briefly summarizing this processing, the file load control unit 1 (FIG. 1) acquires the concerned processor number from the processor configuration management unit 2 (FIG. 1), transfers the processor number to the function database management unit 3 (FIG. 1) as input data, and checks whether or not the function required for the concerned processor has already been installed in the processor. When that function is not installed, it acquires a list of processors in the system installed with functions identical to this (also referred to as the processor connection table) and inquires at the processor configuration management unit 2 etc. whether a processor from that list at a location near the concerned processor (for example, a processor of the next lowest number or next highest number from the concerned processor) can transfer the running files of that function. When that processor is able to transfer the files, the unit loads the target running files by way of the inter-processor communication control unit 8 (FIG. 1) from that processor, e.g., the processor B in FIG. 2, to the concerned processor, for example, the processor C in FIG. 2.

The above processing will be further concretely explained by referring to FIGS. 9a and 9b.

When detecting a file load opportunity (IPL), the file load control unit 1 (FIG. 1) inquires at the processor configuration management unit 2 (FIG. 1) to acquire the number of the concerned processor (step S21). It transfers the processor number to the function database management unit 3 (FIG. 1) as the input information. The function database management unit 3 searches through the function management table by that processor number, checks the status of installation/non-installation of the function to its processor, acquires a list of the functions required for its processor (that is, the functions which are not installed at present), and notifies the information to the file load control unit 1 (step S22).

Note that, at the time of an IPL instruction, no function has yet been installed in the concerned processor, so it is recognized that all of the functions (files) are to be loaded.

The file load control unit 1 inquires at the function database management unit 3 whether or not a processor extracted according to a predetermined retrieval logic while referring to the list of the functions required for its processor has the related function installed. If a processor having the related function installed is found, the unit 1 is sent the running files corresponding to that function from that processor.

The retrieval logic for retrieving this file sending processor, as mentioned above, may be selected from any of:

(i) Consecutive extraction of processor numbers in descending order from concerned processor number (ii) Consecutive extraction of processor numbers in ascending order from concerned processor number (iii) Alternate consecutive extraction of processor numbers in descending order and ascending order from concerned processor number.

Here, in the present embodiment, it is assumed that the above (iii) is selected as the retrieval logic.

Using this selected logic (iii), the processor which has the target function and can transfer the same is determined by the following procedure:

(i) A list of processors having the function required for the concerned processor is searched for from the processors in the system by referring to the function management table in the function database management unit 3.

(ii) The processor having a processor number nearest the concerned processor in the descending order is extracted from the processors having the related function. If that processor is not already transferring files, the running files are loaded from that processor.

(iii) If that processor is already transferring files, the processor having a processor number nearest the concerned processor in the ascending order is extracted.

(iv) If that processor is not already transferring files, the running files are loaded from that processor. If that processor is already transferring files, the processor having a processor number second nearest the concerned processor in the descending order is extracted.

The logic for acquiring the required files from a processor near the concerned processor can be comprised by repeating the above. Note that the logic for finding the file sending processor is not fixed to only the above description. A variety of extraction logics can be obtained.

For the initial function, first, it is judged if the corresponding function is installed in the processor nearest the concerned processor number in the descending order in the processor connection table (step S25). If it has been installed, the routine proceeds to the process of receiving the files from the corresponding processor. The status of the processor is then judged (step S26). When it is in a state where transfer is not possible (for example, it is indicated that the processor status management table is not working, it is indicated that the function management table is busy for the reason of file transfer, etc.), the processor nearest the concerned processor number in ascending order is extracted (step S27). It is then judged if that processor is in a state enabling file transfer (step S28). When it is in a state enabling file transfer, the routine proceeds to the process of receiving the files from the processor. The statuses of the processors are checked in the order of near processors closest to the concerned processor number in this way so as to prevent the concentration of the file transfer processors in the system at one position and to thereby share the processing.

When the check of the configuration of processor connection is completed and it is found that there is no processor having the identical function as that of the concerned processor in the system, the files are received from the processor (file server) holding the running files of all processors, i.e., the main processor. By using such a processing flow, even when the main processor goes down, the running files can be loaded from a processor near the concerned processor, so the continuity of the system can be raised.

When loading the running files corresponding to the initial function and then loading running files corresponding to the next function as well, the running files are loaded by a similar routine to that explained above.

On the other hand, the processor on the side sending the file (processor B) receives a request for file transfer from an opposing processor (processor C) by way of the interprocessor communication control unit 8 (FIG. 1). At that time, the processor number of the processor C and the function number are transferred as input information set by the processor C. By this, the information is transferred as input parameters of the function database management unit 3, the running files of the function to be sent are recognized, file storage information such as the file storage address and the size corresponding to the function for which the request for transfer occurred is acquired, and the fact that the preparations for transfer have been completed is notified to the processor C. The processor C performs the preparations for reading the files of the target function from the processor B, and the processor B sends the related running files (substance) to the processor C.

The processor in which the running files are loaded, i.e., the processor C, activates the function activation unit 4 when all of the files of the function finish being loaded so as to activate the files corresponding to the loaded function (start of service).

Next, an explanation will be made of the method of constructing the function management table (FIG. 7) in the function database management unit 3 (FIG. 1).

In order to set and update the data used in the function database management unit 3, the external instruction/display unit 9 (FIG. 1) is used. This external instruction/display unit 9 is a part for control from the maintenance terminal mounted in the system and control of the display to the maintenance terminal. Usually, even in a multiprocessor system, only one processor is provided for overseeing the operation of the maintenance operation system.

First, the first database (IPL use database) is constructed by off-line processing when preparing the files to be supplied to such an information processing system of a multiprocessor configuration. When preparing the system files off-line, information elements for making up the function database such as the loaded addresses of the files for constructing the system, file sizes, and kinds of the media are picked out and put together as station data. This is forwarded to the processor requiring the files at the file load opportunity (that is, IPL). It is well known to forward the station data to the loaded processor in advance in such a system of a multiprocessor configuration and to use that station data for the IPL, so this will not be explained in detail. By repeating this for the amount of the mounted processors, the initial construction of the function database is completed when the IPL is completed for all processors in the system.

Next, an explanation will be given of the procedure when installing a new function after the start of the on-line operation.

For example, assume that new hardware is added to the system. In this case, it is necessary to fetch the program files for operating that hardware and various kinds of control data into the system. For this purpose, an increase execution instruction is sent to the file load control unit 1 by the function increase/decrease execution unit 7 in FIG. 1. This increase execution instruction also contains the function information (file information) required for the related hardware. The file load control unit 1 inquires at the function database management unit 3 if the instructed function (file function) exists in the system. If that function exists in the system, the file information is returned as it is to the file load control unit 1.

When that function does not exist in the system, the function database management unit 3 (in this case, only the processor in which the external instruction/display unit 9 is mounted) requests the maintenance personnel to load the files required for running the related hardware by using the external instruction/display unit 9. The maintenance personnel loads the medium in which the instructed files are stored into the system to incorporate those files. Thereafter, the loaded file information is transferred to all processors by way of the inter-processor communication control unit 8.

Next, a concrete example of the application of the present invention to an exchange system will be shown.

Figure 10:
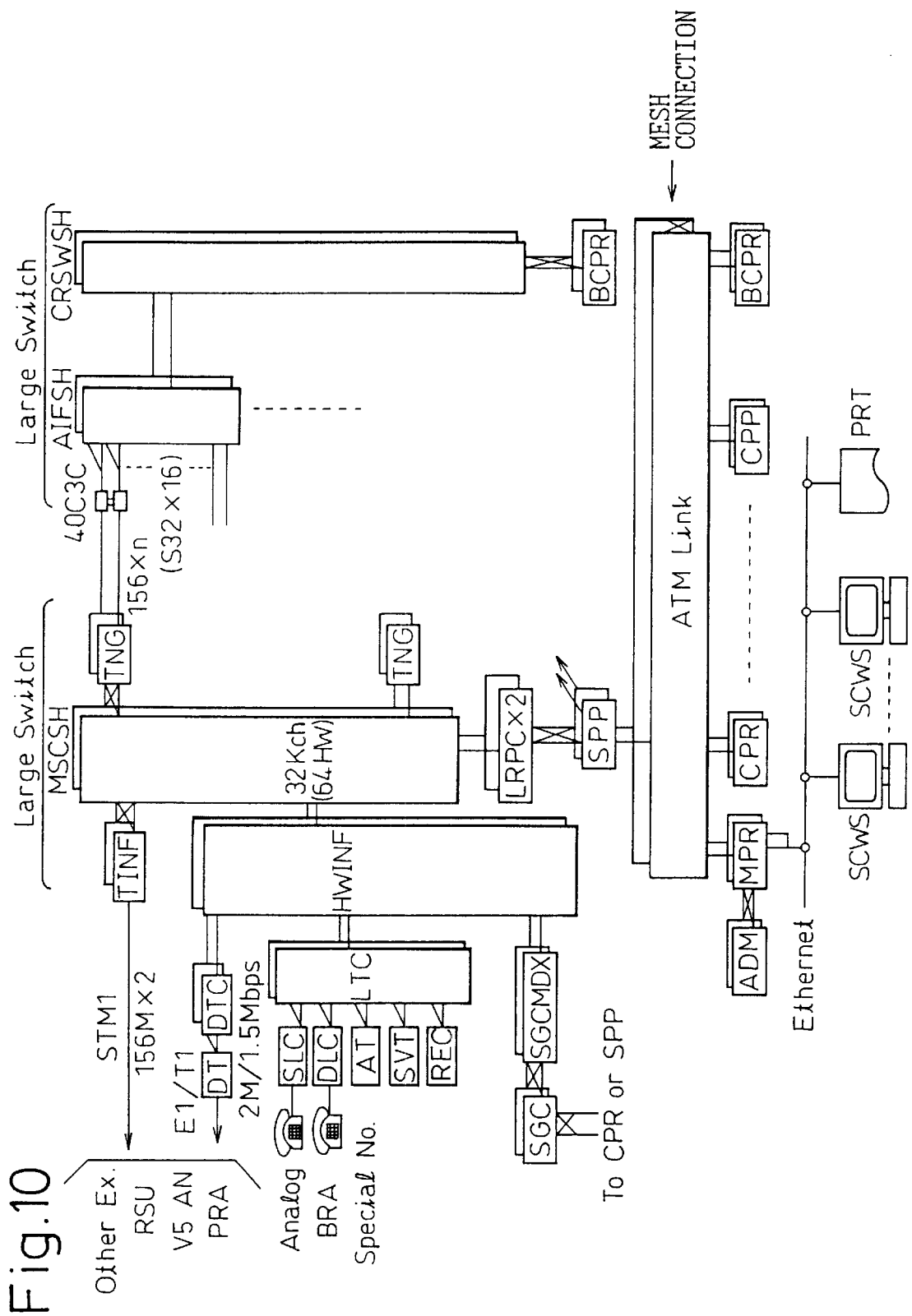
FIG. 10 is a view of a concrete example of application of the file loader of the present invention to an exchange system.

FIG. 10 is a view of the hardware configuration of an exchange system having a mesh-configuration inter-processor connection system. Here, the principal components of this exchange system are:

CRSWSH (Cell Routing Switch Shelf),
AIFSH (Advanced Line/Trunk I/F Shelf),
MSCSH (Medium Switch Control Shelf),
SGCSH (Signal Controller Shelf),
DTSH (Digital Terminal Shelf),
LTSH (Line Trunk Shelf),
LINE (Large Switch I/F),
TINE (Trunk I/F),
HWINF (Highway I/F),
LPPC (Line/Register Signal and Path),
MPR (Main Processor),
CRP (Cell Processor), etc.

The processors A to N in the information processing system of the above multiprocessor configuration correspond to the main processor MPR and the call processors CPR in the exchange system, while the inter-processor communication link corresponds to the ATM link in the figure. The program, control data, etc. for realizing the exchange service are stored in the main memory units in the main processor MPR and the call processors CPU, and the exchange service is realized by the sequential execution of that program by a central processing unit.

Also each means (function means in the block 10) forming the file load control unit 1 (FIG. 1) of the present invention mentioned before is realized by the software stored in the processor in the same way as in the above description. Note that, while not shown in FIG. 10, an external memory 5 is mounted at each processor in the form of a hard disk drive (HDL). The ATM link connecting the processors adopts a mesh connection, so communication among processors can be directly carried out without having to go through any specific processor.

Various modifications are possible in working the present invention. For example, when adding hardware to the system, it may be considered to provide a route for the function increase/decrease execution unit 7 to activate the file load control unit 1 so as to enable automatic loading of new files accompanying addition of hardware. For example, when adding hardware to the processor C in FIG. 2, it is possible to load the required files from a processor B if the identical type of hardware is already installed in the processor B.

Further, in the above embodiment, as the retrieval logic for searching for a processor for sending the running files, a list of processors having desired function installed in them is obtained from the function database management unit 3, processors able to transfer the files are consecutively judged from this list, and the files are transferred from a related processor. However, the present invention is not limited to this. For example, in place of the acquisition of the list from the function database management unit 3, a configuration in which all processors in the system are consecutively selected, the function database management unit 3 is asked if each selected processor has the desired function installed in it, and a processor which has the function installed and is able to transfer the files is made to transfer the files can be adopted.

Further, in the above embodiment, the file transfer requesting processor sent the concerned processor number and the required function number as the file transfer request information to the file sending processor, but it is also possible to send for example concerned processor number and the required running file numbers (numbers of running file missing) in place of this.

Further, in the above embodiment, the explanation was made assuming that the file sending processor transferred all running files required for the function in units of function. However, the present invention is not limited to this. It is of course also possible to have the file sending processor receiving the file transfer request refer to the function database management unit 3 to check what running files are missing in the file transfer requesting processor and to transfer only the missing running files.

Summarizing the effects of the invention, as explained above, by applying the present invention to an information processing system of a multiprocessor configuration, it is possible to load the optimal files, that is, the running files such as data and download files, to the processors making up the system matched to their running modes (functions) and to automatically select a processor for sending the files to a processor to be loaded with the running files flexibly and on-line (in state of service continuity) without fixing on any one processor, therefore the problem when loading such running files of the load concentrating at a specific processor at the time of file transfer can be prevented. Further, even if the file sending processor goes down, the required files can be automatically loaded from another processor, so there is the effect of an improvement of the service and an increase of the operating time of the system as a whole.

What is claimed is:

1. A file loader mounted on a first processor in an information processing system of a multiprocessor configuration, comprising:

a processor configuration managing means for managing status information of processors in the system, a function database managing means for managing storage information of running files corresponding to functions installed in the processors, an inter-processor communication controlling means for communication with the other processors in the system, a file load controlling means for (i) recognizing other processors in the system, said other processors having functions identical to a function which has to be installed in the first processor, based on the storage information managed by the function database managing means, (ii) searching for one of the other processors for sending files according to a predetermined retrieval logic, while referring to the status of said other processors by the status information managed by the processor configuration managing means, and (iii) performing control, via the inter-processor communication controlling means, for making the one other processor load the running files required for the related function to the first processor, a memory for storing the running files loaded from the one other processor, and a function activating means for initializing the first processor in accordance with the running files to activate the related function after the running files finish being loaded from the other processor to the memory.

2. A file loader as set forth in claim 1, wherein said file load controlling means is provided with a plurality of retrieval logics for selecting the file sending processor in advance and can select any retrieval logic from among the plurality of retrieval logics.

3. A file loader as set forth in claim 2, wherein one of said retrieval logics is to consecutively retrieve processors holding the running files required for the concerned processor from a near processor number to the concerned processor to a far processor number.

4. A file loader as set forth in claim 2, wherein the selection of said retrieval logic can be altered from the outside according to an instruction or command of maintenance personnel.

5. A file loader as set forth in claim 1, wherein said function database managing means automatically detects new addition or deletion of a function and simultaneously updates the running file storage information due to the detection at all processors in the system so that they hold identical function databases.

6. A computer readable storage medium storing a program for making a computer act as said processor configuration managing means, said function database managing means, said file load controlling means, and said function activating means in the file loader disclosed in claim 1.

7. A computer readable storage medium storing a program for making a computer act as said processor configuration managing means, said function database managing means, said file load controlling means, and said function activating means in the file loader disclosed in claim 2.

8. A computer readable storage medium storing a program for making a computer act as said processor configuration managing means, said function database managing means, said file load controlling means, and said function activating means in the file loader disclosed in claim 3.

9. A computer readable storage medium storing a program for making a computer act as said processor configuration managing means, said function database managing means, said file load controlling means, and said function activating means in the file loader disclosed in claim 5.

* * * * *